Nov. 22, 1960     L. S. GAUMER, JR     2,960,835
SEPARATION OF GASEOUS MIXTURES
Filed June 10, 1958
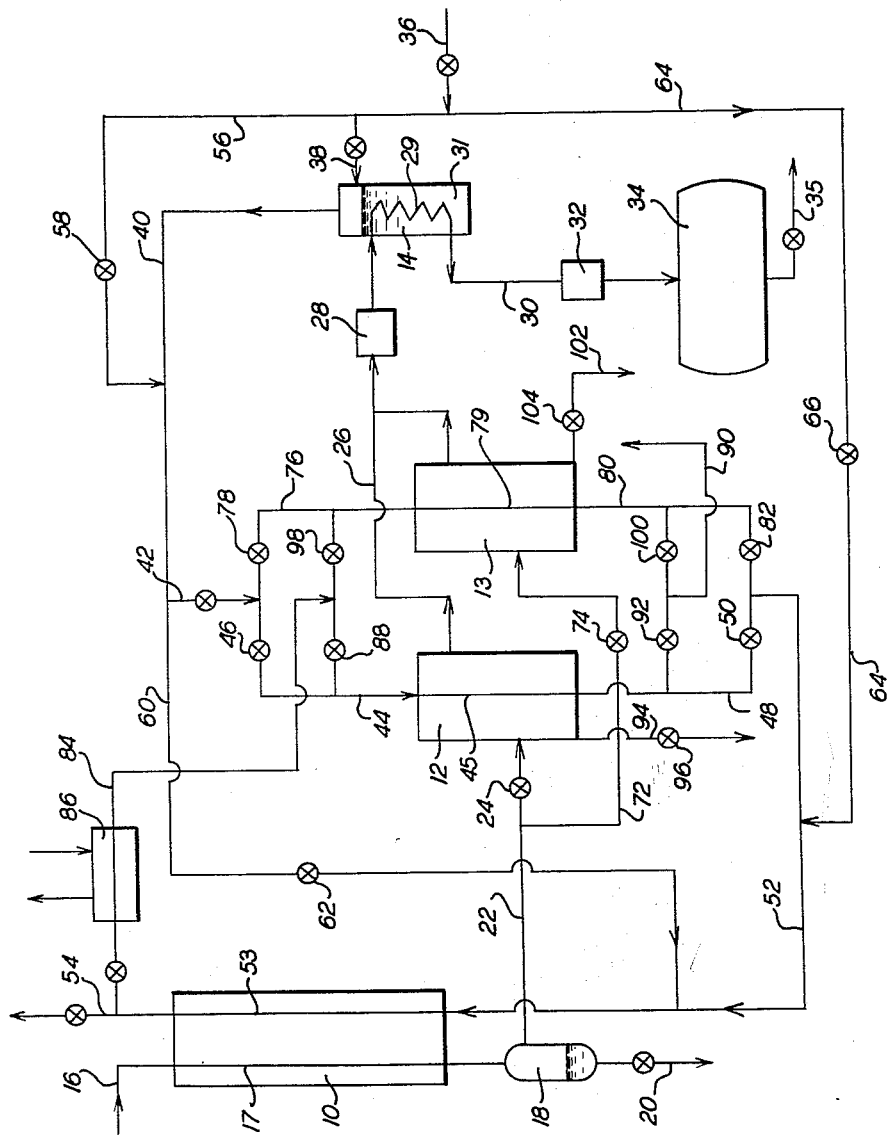
INVENTOR.
LEE S. GAUMER JR.
BY *Shanley & O'Neil*
ATTORNEYS

United States Patent Office 2,960,835
Patented Nov. 22, 1960

2,960,835

SEPARATION OF GASEOUS MIXTURES

Lee S. Gaumer, Jr., Allentown, Pa., assignor to Air Products Incorporated, a corporation of Michigan Filed June 10, 1958, Ser. No. 741,088

16 Claims. (Cl. 62—12)

The present invention relates to methods and apparatus for separating gaseous mixtures, and more particularly to the separation by cooling of mixtures of gases, one of the components of which solidifies at a temperature higher than the liquefaction temperature of another component.

There are numerous instances in the art wherein it would be advantageous to effect separation of components of gaseous mixtures to provide at least one component of high purity as product without requiring a fractionating operation or the use of expensive chemicals. For example, in the commercial production of fluorine, it is common practice to use an electrolytic cell for electrolytic disassociation of hydrogen fluoride so as to produce primarily fluorine and hydrogen. The electrolyte of the cell is for example molten KF.2HF and the concentration of hydrogen fluoride in the cell is maintained for example at 40–42%. At operating temperatures of for example 175° F. to 185° F., the partial pressure of the hydrogen fluoride is such that about 12% by volume is carried out with the hydrogen and fluorine product gases. A small positive pressure is maintained within the electrolytic cell to remove the product gases, the hydrogen being vented to a disposal system and the product fluorine being cooled and condensed to liquid phase for storage. Before liquefaction and storage of the fluorine, the hydrogen fluoride therein must be removed. Not only does the hydrogen fluoride constitute a diluent in the fluoride, but also it is extremely corrosive. Moreover, hydrogen fluoride recovered from the fluorine product is reusable as a portion of the hydrogen fluoride necessary to maintain the proper concentration level in the electrolytic cell.

It is an object of the present invention to provide novel methods and apparatus for the separation of a gaseous mixture of which a first component solidifies at a temperature higher than the liquefaction temperature of a second component, such that a virtually complete separation of the components may be effected.

Another object of the present invention is the provision of novel methods and apparatus for the separation of a gaseous mixture as aforesaid, in which the second component may be recovered in liquid phase and the first component may be recovered in a phase more fluent than solid phase.

It is also an object of the present invention to provide novel methods and apparatus for the separation of such gaseous mixtures, which will be easy to practice and construct, dependable in performance and which will function with a high degree of thermal efficiency.

Finally, it is an object of the present invention to provide such methods and apparatus which will be particularly useful in the separation of the system hydrogen fluoride-fluorine.

Other objects and advantages of the present invention will become apparent from the following description, taken in connection with the accompanying drawing, which is a flow sheet on which are diagrammatically illustrated the novel methods and apparatus of the present invention.

Referring now to the drawing in greater detail, it will be seen that in its very broadest aspects the cycle of the present invention has three principal components: a primary heat exchanger 10 in which an initial separation of a gaseous mixture, for example of fluorine and hydrogen fluoride, is effected by liquefying and withdrawing a major portion of the hydrogen fluoride; a pair of switching heat exchanges 12 and 13 at a lower temperature and in which at least a major portion of the remainder of the hydrogen fluoride is frozen out and removed from the fluorine; and a condenser 14 in which the fluorine gas free from hydrogen fluoride is condensed against a liquid boiling at a lower temperature than fluorine, such as nitrogen. The vapor from the liquid boiling in condenser 14 is then passed in countercurrent heat exchange to provide the principal cold source for exchangers 10, 12 and 13.

Specifically, a stream of gas from a fluorine cell is introduced through conduit 16 as feed mixture. The feed stream may for example be comprised of 2.19 mols per hour of fluorine and 0.39 mol per hour of hydrogen fluoride and have a temperature of 225° F. It is to be understood that except as otherwise indicated, the temperatures and compositions of the various streams of the cycle are for purposes of illustration only and are in no sense to be construed as limitations of the scope of the present invention. The feed stream in conduit 16 passes through one passageway 17 of exchanger 10 and is cooled therein to about —110° F. by countercurrent heat exchange with cold gas such as nitrogen, as described below. The coolant gas may be any gas having a condensation temperature lower than that of fluorine, and reference to "nitrogen" throughout the remainder of the specification is by way of example only.

Hydrogen fluoride condenses at about 77° F., and the hydrogen fluoride of the feed stream leaving exchanger 10 is about 90% in liquid phase. The feed stream is introduced into a phase separator 18 in which 0.35 mol per hour of liquid hydrogen fluoride collect and may be withdrawn through a valved drain 20. The vapor phase of the feed stream leaves phase separator 18 through conduit 22 at about —110° F. and contains 2.19 moles per hour of fluorine and 0.04 mol per hour of hydrogen fluoride for a hydrogen fluoride content of about 1.8% by volume. The stream passes through conduit 22 having open valve 24 and into on-stream exchanger 12 and through the shell side of this exchanger wherein it is cooled to a temperature of about —250° F. by countercurrent heat exchange with still colder nitrogen gas described below. This temperature is well above the condensation temperature of fluorine, so that all the initial fluorine, or 2.19 mols per hour, leaves exchanger 12 in vapor phase and passes into conduit 26. However, hydrogen fluoride solidifies at about —117.5° F. so that virtually all the remaining hydrogen fluoride in the feed stream, or 0.04 mol per hour, is deposited in solid phase in the exchanger 12. Inevitably, some hydrogen fluoride "snow" will be entrained and carried into conduit 26, but this is removed from the fluorine stream in a filter 28.

Cold fluorine gas essentially free from hydrogen fluoride then flows through passageway 29 of condenser 14 where it is condensed by heat exchange with a pool 31 of liquid nitrogen boiling at about —320° F. The liquid fluorine then leaves through conduit 30, passes through filter 32 where any remaining impurities in solid phase are removed, and into storage container 34 from which it may be withdrawn through valved conduit 35.

Liquid nitrogen to supply the cold requirements of the cycle is introduced through valved conduits 36 and 38 into the shell of condenser 14 and leaves the condenser in vapor phase through conduit 40. The quantity of nitrogen passing through conduits 38 and 40 may for example be 3.3 mols per hour. A major proportion of the gaseous nitrogen in conduit 40, such as 1.85 mols per hour, passes through valved conduit 42 and through conduit 44 past open valve 46 therein and through passageway 45 of on-stream exchanger 12 to supply the cold requirements for that exchanger. The vapor in conduits 40, 42 and 44 is at a temperature of about −315° F. and leaves exchanger 12 at a temperature of about −120° F. through conduit 48 having an open valve 50 therein and through conduit 52 and finally through passageway 53 of exchanger 10 in countercurrent heat exchange with the feed gas and out through valved conduit 54 at a temperature of about 100° F.

In order to provide the cold necessary to start up the cycle, a quantity of liquid nitrogen introduced through conduit 36 is conducted through conduit 56 past open valve 58 and into conduit 40. Once the cycle is stabilized, valve 58 can be closed.

The quantity of cold gaseous nitrogen which flows through conduit 40 is determined by the quantity of fluorine which must be condensed in condenser 14. Thus, although 3.3 mols per hour of this cold gas are necessarily produced, only 1.85 mols per hour are required for exchangers 12 or 13. If all the cold nitrogen gas were passed through exchangers 12 or 13, there would be danger of liquefication of a portion of the fluorine, and hence the remaining 1.45 mols per hour of cold nitrogen gas at about −315° F. are conducted through conduit 60 past open valve 62 therein and added to the stream passing through conduit 52 to increase the refrigerative capacity of this stream relative to the feed stream passing in countercurrent therewith through exchanger 10. The cold requirements of exchanger 10 are substantially greater than those of exchangers 12 or 13 since a major portion of the hydrogen fluoride is liquefied in exchanger 10 and its latent heat of vaporization must be compensated as well as the sensibile heat of the feed stream. Therefore, it will be appreciated that the need for limiting the cold supplied to exchangers 12 or 13, as well as a portion of the need for supplying additional cold to exchanger 10, are nicely accommodated by a diversion of a portion of the cold nitrogen gas through conduit 60.

Hydrogen fluoride has an unusually high latent heat of vaporization, and even the diversion of a portion of the cold nitrogen through conduit 60 does not supply all the cold requirements of exchanger 10. Accordingly, a quantity of liquid nitrogen, for example 0.91 mol per hour, is fed from conduit 36 through conduit 64 past a control valve 66 therein and introduced in liquid phase into conduit 52. The gaseous nitrogen in conduit 52 exiting from exchangers 12 or 13 is at about −120° F. and hence the liquid nitrogen fed thereto by way of conduit 64 rapidly vaporizes. Adding together the nitrogen streams through conduits 52, 60 and 64, it will be seen that the nitrogen entering the cold end of exchanger 10 has a flow rate of about 4.21 mols per hour and a temperature of about −300° F.

At least a portion of the additional cold requirements of exchanger 10 could be supplied by arrangements alternative to those illustrated. For example, in place of the liquid nitrogen introduced through conduit 64, cold could be supplied to the nitrogen entering the cold end of exchanger 10 by heat exchange with boiling nitrogen, or the liquid hydrogen fluoride collected in phase separator 18 could be returned through and evaporated in a separate passageway of exchanger 10. Moreover, the gaseous nitrogen from conduit 60 and/or the liquid nitrogen from conduit 64 may be conducted through separate passageways of exchanger 10.

From time to time, the deposit of hydrogen fluoride in solid phase on the shell side of exchangers 12 or 13 becomes undesirably great and it is necessary to switch the exchangers, defrosting the exchanger which had previously been on stream. Thus, when exchanger 12 requires defrosting, valve 24 is closed and the feed stream through conduit 22 is diverted through conduit 72 past an open valve 74 therein and into exchanger 13, where the remaining hydrogen fluoride is deposited in solid phase, the fluorine proceeding through conduit 26 and filter 28 as before. At the same time, the cold countercurrent nitrogen gas which had previously passed through conduit 44 is now diverted through conduit 76 by closing valve 46 and opening valve 78 for flow through passageway 79 of exchanger 13. Valve 50 is closed and the countercurrent nitrogen leaves exchanger 13 through conduit 80 past open valve 82 therein and enters conduit 52.

When exchanger 13 is onstream, exchanger 12 is defrosted by diverting a portion of the waste nitrogen from valved conduit 54 through valve conduit 84 and a water jacket 86 in which the temperature of the diverted waste nitrogen is reduced to below the boiling point of hydrogen fluoride. The purging gas then passes through valve 88 and into conduit 44 and passes through the tube side of exchanger 12 to melt but not boil the solid phase hydrogen fluoride therein. The spent purging gas is then vented through a conduit 90 past a valve 92 therein. The melted but not boiling hydrogen fluoride from exchanger 12 is removed through a drain having a valve 96 therein and may be reused; but since it is available in such small quantities as 0.04 mol per hour, it may in some instances be more economical simply to discard it.

When exchanger 12 has been defrosted, and the accumulation of solid phase hydrogen fluoride in exchanger 13 requires that exchanger 13 be defrosted, the feed stream and cold nitrogen are again sent in countercurrent through exchanger 12. Valves 74, 78 and 82 are closed and valves 24, 46 and 50 are opened. The purging gas is diverted from exchanger 12 to exchanger 13 by closing valves 88 and 92 and opening valves 98 and 100. Valve 96 is closed to close drain 94 and drain 102 takes care of the liquid hydrogen fluoride melted from the shell side of exchanger 13 when valve 104 is open.

It will therefore be observed that the present invention provides methods and apparatus for the separation of gaseous mixtures by cooling, characterized by three-stage countercurrent cooling successively to liquefy and then freeze the impurity and then liquefy the remaining feed, with less than the entire cold material which effects liquefaction of the remaining feed in the third step being used as a cooling medium in the second or freezing step. There is also provided methods and apparatus characterized by three-stage cooling as described above, in which the final condensation of the product is performed by countercurrent heat exchange relation with a material in a phase more fluent than solid phase which is at all times maintained separate from the finally condensed product.

From a consideration of all of the foregoing, it will be obvious that each of the initially recited objects of the present invention has been achieved.

Although this invention has been described and illustrated in connection with a preferred embodiment, it is to be understood that modifications and variations may be resorted to without departing from the spirit of the invention, as those skilled in this art will readily understand.

For example, although the present invention is described in the environment of separating hydrogen fluoride-fluorine mixtures, it is to be expressly understood that the novel methods and apparatus disclosed and claimed herein may be utilized in the separation of other gaseous mixtures including one component which solidifies at a temperature higher than the liquefaction temperature of another component. Reference therefore will be had to the appended claims for a definition of the limits of the invention.

What is claimed is:

1. A method of separating a mixture of gases of which a first component solidifies at a temperature higher than the liquefaction temperature of a second component, comprising the steps of cooling the mixture to a temperature below the liquefaction temperature of the first component, separating from the mixture a major portion of the first component in liquid phase, further cooling the remaining mixture to a temperature below the solidification temperature of the first component to solidify at least a major portion of the remainder of the first component, still further cooling the second component by heat exchange with material having a liquefaction temperature lower than the liquefaction temperature of the second component to liquefy at least a major portion of the second component, thereafter using said material to supply cold in the first said cooling step and using at least a portion of said material to supply cold in the second said cooling step, and maintaining said material at all times separate from the material of said mixture.

2. A method of separating a mixture of gases of which a first component solidifies at a temperature higher than the liquefaction temperature of a second component, comprising the steps of cooling the mixture to a temperature below the liquefaction temperature of the first component, separating from the mixture a major portion of the first component in liquid phase, further cooling the remaining mixture to a temperature below the solidification temperature of the first component to solidify at least a major portion of the remainder of the first component, still further cooling the second component by heat exchange with liquid material having a liquefaction temperature lower than the liquefaction temperature of the second component to liquefy at least a major portion of the second component and to vaporize said liquid material, thereafter using said vaporized material to supply cold in the first said cooling step and using at least a portion of said vaporized material to supply cold in the second said cooling step, and maintaining said material at all times separate from the material of said mixture.

3. A method of separating a mixture of gases of which a first component solidifies at a temperature higher than the liquefaction temperature of a second component, comprising the steps of cooling the mixture to a temperature below the liquefaction temperature of the first component, separating from the mixture a major portion of the first component in liquid phase, further cooling the remaining mixture to a temperature below the solidification temperature of the first component to solidify at least a major portion of the remainder of the first component, still further cooling the second component by heat exchange with material having a liquefaction temperature lower than the liquefaction temperature of the second component to liquefy at least a major portion of the second component, and thereafter using said material to supply cold in the first said cooling step and using a portion only of said material to supply cold in the second said cooling step.

4. A method of separating a mixture of gases of which a first component solidifies at a temperature higher than the liquefaction temperature of a second component, comprising the steps of cooling the mixture to a temperature below the liquefaction temperature of the first component, separating from the mixture a major portion of the first component in liquid phase, further cooling the remaining mixture to a temperature below the solidification temperature of the first component to solidify at least a major portion of the remainder of the first component, still further cooling the second component by heat exchange with liquid material having a liquefaction temperature lower than the liquefaction temperature of the second component to liquefy at least a major portion of the second component and to vaporize said liquid material, and thereafter using said vaporized material to supply cold in the first said cooling step and using a portion only of said vaporized material to supply cold in the second said cooling step.

5. A method of separating a mixture of hydrogen fluoride and fluorine, comprising the steps of cooling the mixture to a temperature below the liquefaction temperature of the hydrogen fluoride, separating from the mixture a major portion of the hydrogen fluoride in liquid phase, further cooling the remaining mixture to a temperature below the solidification temperature of the hydrogen fluoride to solidify at least a major portion of the remainder of the hydrogen fluoride, still further cooling the fluorine by heat exchange with material having a liquefaction temperature lower than the liquefaction temperature of the fluorine to liquefy at least a major portion of the fluorine, thereafter using said material to supply cold in the first said cooling step and using at least a portion of said material to supply cold in the second said cooling step, and maintaining said material and the fluorine at all times separate from each other.

6. A method of separating a mixture of hydrogen fluoride and fluorine, comprising the steps of cooling the mixture to a temperature below the liquefaction temperature of the hydrogen fluoride, separating from the mixture a major portion of the hydrogen fluoride in liquid phase, further cooling the remaining mixture to a temperature below the solidification temperature of the hydrogen fluoride to solidify at least a major portion of the remainder of the hydrogen fluoride, still further cooling the fluorine by heat exchange with liquid material having a liquefaction temperature lower than the liquefaction temperature of the fluorine to liquefy at least a major portion of the fluorine and to vaporize said liquid material, thereafter using said vaporized material to supply cold in the first said cooling step and using at least a portion of said vaporized material to supply cold in the second said cooling step, and maintaining said material and the fluorine at all times separate from each other.

7. A method of separating a mixture of hydrogen fluoride and fluorine, comprising the steps of cooling the mixture to a temperature below the liquefaction temperature of the hydrogen fluoride, separating from the mixture a major portion of the hydrogen fluoride in liquid phase, further cooling the remaining mixture to a temperature below the solidification temperature of the hydrogen fluoride to solidify at least a major portion of the remainder of the hydrogen fluoride, still further cooling the fluorine by heat exchange with material having a liquefaction temperature lower than the liquefaction temperature of the fluorine to liquefy at least a major portion of the fluorine, and thereafter using said material to supply cold in the first said cooling step and using a portion only of said material to supply cold in the second said cooling step.

8. A method of separating a mixture of hydrogen fluoride and fluorine, comprising the steps of cooling the mixture to a temperature below the liquefaction temperature of the hydrogen fluoride, separating from the mixture a major portion of the hydrogen fluoride in liquid phase, further cooling the remaining mixture to a temperature below the solidification temperature of the hydrogen fluoride to solidify at least a major portion of the remainder of the hydrogen fluoride, still further cooling the fluorine by heat exchange with liquid material having a liquefaction temperature lower than the liquefaction temperature of the fluorine to liquefy at least a major portion of the fluorine and to vaporize said liquid material, and thereafter using said vaporized material to supply cold in the first said cooling step and using a portion only of said vaporized material to supply cold in the second said cooling step.

9. A method of separating a mixture of hydrogen fluoride and fluorine, comprising the steps of cooling the mixture to a temperature below the liquefaction temperature of the hydrogen fluoride, separating from the mixture a major portion of the hydrogen fluoride in liquid phase, further cooling the remaining mixture to a temperature below the solidification temperature of the hydrogen fluoride to solidify at least a major portion of the remainder of the hydrogen fluoride, still further cooling the fluorine by heat exchange with nitrogen at a temperature below the liquefaction temperature of the fluorine to liquefy at least a major portion of the fluorine, and thereafter using the nitrogen to supply cold in the first said cooling step and using at least a portion of the nitrogen to supply cold in the second said cooling step.

10. A method of separating a mixture of hydrogen fluoride and fluorine, comprising the steps of cooling the mixture to a temperature below the liquefaction temperature of the hydrogen fluoride, separating from the mixture a major portion of the hydrogen fluoride in liquid phase, further cooling the remaining mixture to a temperature below the solidification temperature of the hydrogen fluoride to solidify at least a major portion of the remainder of the hydrogen fluoride, still further cooling the fluorine by heat exchange with liquid nitrogen to liquefy at least a major portion of the fluorine and to vaporize the nitrogen, and thereafter using the vaporized nitrogen to supply cold in the first said cooling step and using at least a portion of the vaporized nitrogen to supply cold in the second said cooling step.

11. A method of separating a mixture of hydrogen fluoride and fluorine, comprising the steps of cooling the mixture to a temperature below the liquefaction temperature of the hydrogen fluoride, separating from the mixture a major portion of the hydrogen fluoride in liquid phase, further cooling the remaining mixture to a temperature below the solidification temperature of the hydrogen fluoride to solidify at least a major portion of the remainder of the hydrogen fluoride, still further cooling the fluorine by heat exchange with nitrogen at a temperature below the liquefaction temperature of the fluorine to liquefy at least a major portion of the fluorine, and thereafter using the nitrogen to supply cold in the first said cooling step and using a portion only of the nitrogen to supply cold in the second said cooling step.

12. A method of separating a mixture of hydrogen fluoride and fluorine, comprising the steps of cooling the mixture to a temperature below the liquefaction temperature of the hydrogen fluoride, separating from the mixture a major portion of the hydrogen fluoride in liquid phase, further cooling the remaining mixture to a temperature below the solidification temperature of the hydrogen fluoride to solidify at least a major portion of the remainder of the hydrogen fluoride, still further cooling the fluorine by heat exchange with liquid nitrogen to liquefy at least a major portion of the fluorine and to vaporize the liquid nitrogen, and thereafter using the vaporized nitrogen to supply cold in the first said cooling step and using a portion only of the vaporized nitrogen to supply cold in the second said cooling step.

13. Apparatus for separating a mixture of gases of which a first component solidifies at a temperature higher than the liquefaction temperature of a second component, comprising means for cooling the mixture to a temperature below the liquefaction temperature of the first component, means for separating from the mixture a major portion of the first component in liquid phase, means for further cooling the remaining mixture to a temperature below the solidification temperature of the first component to solidify at least a major portion of the remainder of the first component, means for still further cooling the second component by heat exchange with material having a liquefaction temperature lower than the liquefaction temperature of the second component to liquefy at least a major portion of the second component, means for thereafter using said material to supply cold in the first said cooling step and for using at least a portion of said material to supply cold in the second said cooling step, and means for maintaining said material at all times separate from the material of said mixture.

14. Apparatus for separating a mixture of gases of which a first component solidifies at a temperature higher than the liquefaction temperature of a second component, comprising means for cooling the mixture to a temperature below the liquefaction temperature of the first component, means for separating from the mixture a major portion of the first component in liquid phase, means for further cooling the remaining mixture to a temperature below the solidification temperature of the first component to solidify at least a major portion of the remainder of the first component, means for still further cooling the second component by heat exchange with liquid material having a liquefaction temperature lower than the liquefaction temperature of the second component to liquefy at least a major portion of the second component and to vaporize said liquid material, means for thereafter using said vaporized material to supply the cold in the first said cooling step and for using at least a portion of said vaporized material to supply cold in the second said cooling step, and means for maintaining said material at all times separate from the material of said mixture.

15. Apparatus for separating a mixture of gases of which a first component solidifies at a temperature higher than the liquefaction temperature of a second component, comprising means for cooling the mixture to a temperature below the liquefaction temperature of the first component, means for separating from the mixture a major portion of the first component in liquid phase, means for further cooling the remaining mixture to a temperature below the solidification temperature of the first component to solidify at least a major portion of the remainder of the first component, means for still further cooling the second component by heat exchange with material having a liquefaction temperature lower than the liquefaction temperature of the second component to liquefy at least a major portion of the second component, and means for thereafter using said material to supply cold in the first cooling step and for using a portion only of said material to supply cold in the second said cooling step.

16. Apparatus for separating a mixture of gases of which a first component solidifies at a temperature higher than the liquefaction temperature of a second component, comprising means for cooling the mixture to a temperature below the liquefaction temperature of the first component, means for separating from the mixture a major portion of the first component in liquid phase, means for further cooling the remaining mixture to a temperature below the solidification temperature of the first component to solidify at least a major portion of the remainder of the first component, means for still further cooling the second component by heat exchange with liquid material having a liquefaction temperature lower than the liquefaction temperature of the second component to liquefy at least a major portion of the second component and to vaporize said liquid material, and means for thereafter using said vaporized material to supply cold in the first said cooling step and for using a portion only of said vaporized material to supply cold in the second said cooling step.

References Cited in the file of this patent

UNITED STATES PATENTS

| 2,022,782 | Pollitzer | Dec. 3, 1935 |

FOREIGN PATENTS

| 482,561 | Germany | Aug. 29, 1929 |
| 604,773 | Germany | Oct. 11, 1934 |